United States Patent
Boman

(10) Patent No.: US 7,843,860 B2
(45) Date of Patent: Nov. 30, 2010

(54) ARRANGEMENT, NODES AND A METHOD RELATING TO SERVICES ACCESS OVER A COMMUNICATION SYSTEM

(75) Inventor: Krister Boman, Mölndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 658 days.

(21) Appl. No.: 11/719,062

(22) PCT Filed: Mar. 17, 2005

(86) PCT No.: PCT/EP2005/002837

§ 371 (c)(1),
(2), (4) Date: Dec. 10, 2007

(87) PCT Pub. No.: WO2006/050758

PCT Pub. Date: May 18, 2006

(65) Prior Publication Data

US 2008/0198845 A1    Aug. 21, 2008

Related U.S. Application Data

(60) Provisional application No. 60/626,691, filed on Nov. 10, 2004.

(51) Int. Cl.
*H04B 7/00* (2006.01)
(52) U.S. Cl. ...................................... 370/310
(58) Field of Classification Search ............... 370/310, 370/328; 455/410, 411, 434, 435
See application file for complete search history.

(56) References Cited

U.S. PATENT DOCUMENTS

| | | | |
|---|---|---|---|
| 6,445,922 B1 * | 9/2002 | Hiller et al. | ................. 455/433 |
| 7,031,314 B2 * | 4/2006 | Craig et al. | ................. 370/392 |
| 7,065,067 B2 * | 6/2006 | Song et al. | ................. 370/338 |
| 7,120,148 B1 * | 10/2006 | Batz et al. | ................. 370/392 |
| 7,483,690 B2 * | 1/2009 | Muramatsu et al. | ......... 455/410 |
| 7,545,762 B1 * | 6/2009 | McConnell et al. | ...... 370/310.2 |

(Continued)

OTHER PUBLICATIONS

3GPP TR 33.878 V0.03 Technical Specification Group services, 3GPP, Oct. 2004, pp. 1-16.*

*Primary Examiner*—Dmitry H Levitan
(74) *Attorney, Agent, or Firm*—Roger S. Burleigh

(57) ABSTRACT

The present invention relates to an arrangement in a communications system participating in user station (UE; 1) service request and/or access procedures and comprising a number of packet data support nodes (10), a number of charging and/or policy handling nodes (30) and a number of application functions (20) handling mobility management and call control of mobile user stations requesting and/or accessing services. The packet data support node(s) (10) comprise(s) means adapted to send first mobile user station identity related information over a first interface (Gx,Gy; Gx/Gy) to a charging and/or policy handling node (30), at reception of a request for bearer services from a mobile user station (1). The application function(s) (20) comprise(s) means for, at reception of a request for a service session (SIP) from a mobile user station (1), sending second mobile user station identity related information to the charging and/or policy handling node (30), over a second interface (Rx,Rx/Gq). The policy and/or charging handling node (30) comprises verification means (32) adapted to establish whether the request for a bearer service to the packet data support node (10) and the request for a service session to the application function (20) (AF; P/S/I-CSCF) originate from one and the same mobile user station (1).

10 Claims, 11 Drawing Sheets

U.S. PATENT DOCUMENTS

| | | | |
|---|---|---|---|
| 7,574,735 B2 * | 8/2009 | Pirttimaa et al. | 726/13 |
| 7,616,647 B1 * | 11/2009 | Madhavarapu et al. | 370/401 |
| 7,668,145 B2 * | 2/2010 | Le et al. | 370/338 |
| 7,770,216 B2 * | 8/2010 | Blicker et al. | 726/12 |
| 2003/0154400 A1 * | 8/2003 | Pirttimaa et al. | 713/201 |
| 2004/0252683 A1 * | 12/2004 | Kennedy et al. | 370/389 |

* cited by examiner

ARRANGEMENT, NODES AND A METHOD RELATING TO SERVICES ACCESS OVER A COMMUNICATION SYSTEM

This application claims the benefit of U.S. Provisional Application No. 60/626,691, filed Nov. 10, 2004, the disclosure of which is fully incorporated herein by reference.

FIELD OF THE INVENTION

The present invention relates to an arrangement in a communications system participating in user station service request or access procedures and it comprises a number of packet data support nodes, a number of charging and/or policy handling nodes and a number of application functions handling mobility management and call control of mobile user stations requesting or accessing services. The invention also relates to a node in a communications system supporting communication of packet data which is arranged to communicate with an application function and a packet data support node.

Still further the invention relates to a method involved in service request/access, in a communications system supporting communication of packet data and comprising a number of packet data nodes, a number of charging and/or policy handling nodes and a number of application functions handling mobility management and call control of mobile user stations requesting/accessing services.

STATE OF THE ART

So called IM (Internet IP Multimedia) services are getting more and more attractive and are already widely used. 3GPP IMS (IP Multimedia Subsystems) provides an IP-based session control capability which is based on the SIP protocol (Session based Initiation Protocol). IMS may for example be used for the provisioning of services such as push-to-talk, instant messaging, presence and conferencing. IMS in UMTS (Universal Mobile Telecommunication System) will support IP multimedia applications such as video, audio and multimedia conferences. As referred to above, 3GPP will use the SIP, Session Initiation Protocol, as the signalling protocol for creating and terminating multimedia sessions, c.f. for example IETF RFC (Request For Comments) 3261, which deals with how the SIP signalling is protected between the subscriber and the IMS, how the subscriber is authenticated and how the subscriber authenticates the IMS.

The current security architecture for IMS is specified in 3GPP TS 33.203. However, it is a problem that implementations of the services referred to above will exist which are not fully compliant with 3GPP IMS. 3GPP IMS for example exclusively uses IPv6 (Internet Protocol version 6) although there may still be IMS implementations based on IPv4. However, the use of IPv4 instead of IPv6 is only one of the differences between "early" IMS implementations and implementations complying with 3GPP IMS to a full extent. It has been recognized that non-compliance with 3GPP TS 33.203 security features, will mainly produce problems at the user equipment (UE) due to the potential lack of support of the USIM/ISIM interface, particularly for user stations only complying with 2G. It has therefore been realized that, for such "early" IMS implementations, mechanisms are needed to protect against the most significant security threats.

Such a temporary solution for "early" IMS implementations is suggested in 3GPP TR 33.878. The approach in this document is that the GGSN (Gateway GPRS Support Node) shall send Mobile Station Integrated Services Digital Network (MISISDN) and the IP address of a user station (User Equipment UE) towards a Radius server over the Gi interface. The Radius server then forwards the MSISDN and IP address to the HSS (Home Subscriber Server) When the user station, or the UE, sends a SIP register request towards a Serving-Call/Session Control Function (S-CSCF), including the IM (IP Multimedia) private identity, the S-CSCF will query the HSS, which, based on the IMS identity can identify the matching MSISDN and IP address of the UE and return the IP address to the S-CSCF. The S-CSCF will check with the stored IP address in the S-CSCF to see if it matches the received IP address from the UE. If the two IP addresses are the same, the S-CSCF can proceed with the registration procedure but if they are not the same, presumably due to an attack being in progress, the session is terminated. This gives a possibility to avoid certain attacks such as for example an attacker using the IMS identities of a victim, which may have as a consequence that the attacked user has to pay for the service accessed by the attacker.

An operator also runs the risk that the attacker does not pay for the bearer, e.g. a conversational bearer, due to the fact that for example FBC (Flow Based Charging) is implemented and zero rates the bearer. This means that for some use cases, an attacker could use certain services for free.

3GPP TR 33.878 assumes that "During a PDP-context request towards the IMS, the GGSN shall send a "Radius Accounting-Request-Start" message to a Radius server attached to the HSS. This may lead to the assumption that an operator uses a specific IMS APN (Access Point Name) or that the UE uses a signalling PDP-context. It is however believed that the assumption relating to the use of a specific IMS APN is too restrictive from an architectural point of view. 3GPP TS 23.228 stipulates that "When the UE uses GPRS-access for IMS services, it shall be able to establish a dedicated signalling PDP-context for IM subsystem related signalling or utilize a general-purpose PDP-context for IM subsystem signalling traffic". There is hence no guarantee that the UE uses a signalling PDP-context for IMS, may lead to the conclusion that the GGSN should then send the IP address of a UE towards a Radius server for all services. Further, an UE may have several IP addresses towards one and the same GGSN and it appears necessary that the GGSN, in such a case, has to send all these IP addresses towards the Radius server. Furthermore, in the general case a UE may be attached to more than one GGSNs or it may have activated more than one IP network connections. Such scenarios are not discussed in 3GPP TR 33.878.

Furthermore, the solution discussed in this document suggests the introduction of a so called "idle timer" in GGSN. This has an impact on how IP addresses towards an UE are allocated or released and an IP address can be reused for a user when re-establishing a PDP-context at a later stage. Apparently the reason for the introduction of the idle timer is to reduce the load on the HSS and, when there is no PDP-context available between GGSN and an UE, the GGSN stores or reserves the allocated IP address for a specific UE for a time which is equal to the time period set in the idle timer. This means that the GGSN does not upon termination of all bearers send an accounting-request stop until the idle timer has expired. Thus the idle timer has not been introduced for security reasons but in order to reduce the communication towards the HSS which is responsible for the creation of authentication vectors and hence the intention is to reduce communication with the HSS, or not to allow more communication with HSS than necessary in order to avoid that it becomes overloaded, which might have the effect that other services, for example voice, would suffer. The use of the idle timer is disadvantageous for example in that there will be an increasing risk for conflicts between dynamically allocated IP addresses. Furthermore resources are held more than necessary.

The suggested solution is also disadvantageous in that more and more information is sent from GGSN over the Gi interface which will become more and more loaded. It is also disadvantageous that a Radius server is needed in order to verify the IP addresses and, as referred to above, it does not take general architectures into account such as when a UE for example is attached to more than one GGSN and/or has activated more than one IP network connection etc.

SUMMARY OF THE INVENTION

Therefore an arrangement as initially referred to is provided wherein the packet data support node (s)/comprise (s) means adapted to send first mobile user station identity related information over a first interface (Gx,Gy; Gx/Gy) to a charging and/or policy handling node, at reception of a request for bearer services from a mobile user station, the application function (s) comprise (s) means for, at reception of a request for a service session (SIP) from a mobile user station (UE), sending second mobile user station identity related information to the charging and/or policy handling node, over a second interface (Rx,Rx/Gq), and wherein the policy and/or charging handling node comprises verification means adapted to establish whether the request for a bearer service to the packet data support node and the request for a service session to the application function (AF; P/S/I-CSCF) originate from one and the same mobile user station (UE). Particularly the first mobile user station identity related information comprises one or more of MSISDN, International Mobile Subscriber Identity (IMSI) and IP address of the mobile user station, and the second mobile user station identity related information comprises IMS private identity (IMPI) and/or IMS public identity (IMPU), or IMSI and/or MSISDN, e.g. derived from IMS private or public identity (IMPI, IMPU), or the application function being adapted to fetch said information externally, e.g. from a HSS.

Particularly an arrangement is needed which is flexible and which can be adapted to different network environments, such as for example so called aware network environments. Still further an arrangement is needed which takes into account and takes advantage of the development for example within 3GPP or similar systems. Still further an arrangement is needed through which the amount of information sent over the so called Gi interface from Gateway GPRS Support Nodes or similar can be reduced instead of increased. Most particularly an arrangement is needed through which there is no need for the introduction of additional nodes and more generally through which the number of nodes involved and affected can be kept as low as possible. An arrangement is also needed which reduces or even eliminates the drawbacks and impacts on IP address allocation or release towards an UE arising through the introduction of a so called idle timer in a GGSN.

Still further an arrangement is needed which can be used in a general architecture and which takes into account situations, as for example when a user equipment is attached to more than one GGSN (or CGSNs or other gateways) and/or when a user equipment has activated more than one IP network connection. Still further a node is needed which assists in provisioning of one or more of the objects referred to above. Still further a method is needed through which one or more of the abovementioned objects can be achieved.

Therefore an arrangement as initially referred to is provided wherein the packet data support node(s)/comprise(s) means adapted to send first mobile user station identity related information over a first interface (Gx,Gy; Gx/Gy) to a charging and/or policy handling node, at reception of a request for bearer services from a mobile user station, the application function(s) comprise(s) means for, at reception of a request for a service session (SIP) from a mobile user station (UE), sending second mobile user station identity related information to the charging and/or policy handling node, over a second interface (Rx, Rx/Gq), and wherein the policy and/or charging handling node comprises verification means adapted to establish whether the request for a bearer service to the packet data support node and the request for a service session to the application function (AF; P/S/I-CSCF) originate from one and the same mobile user station (UE). Particularly the first mobile user station identity related information comprises one or more of MSISDN, IMSI and IP address of the mobile user station, and the second mobile user station identity related information comprises IMS private identity (IMPI) and/or IMS public identity (IMPU), or IMSI and/or MSISDN, e.g. derived from IMS private or public identity (IMPI,IMPU), or the application function being adapted to fetch said information externally, e.g. from a HSS.

Particularly the IP addresses are received in, or derived from, the first mobile user station related information and the second mobile user station identity related information, and the verification means are adapted to compare the IP address obtained from the application function (AF) with the IP address obtained from the packet data support node. In one embodiment the verification means are adapted to, if required, establish and, use IMSI and/or MSISDN of said first and second mobile user station identity related information respectively, to compare the associated IP addresses. The charging and/or policy handling node may also be adapted to deduce IMSI and/or MSISDN from a received IMS private and/or public user identity (IMPI/IMPU).

In an advantageous embodiment the charging and/or policy handling node is adapted to construe a private user identity using IMSI of a mobile user station, e.g. when no ISIM application is implemented and further it is particularly adapted to identify and install charging rules to be applied at reception of a request therefor from a packet data support node.

According to the invention, if the first and second user identity related information do originate from one and the same mobile user station, the charging and/or policy handling node is particularly adapted to implement the provisioned charging rules. If, on the other hand, the first and second user identity related information do not originate from one and the same mobile user station, the charging and/or policy handling node may be adapted to reject the charging rules and/or deactivate implemented charging rules and discard concerned IP flow traffic, and further be adapted to inform the application function (AF) that no PDP-context is available.

Alternatively, if the first and second user identity related information do not originate from one and the same mobile user station, the charging and/or policy handling node may be adapted to select whether to or deactivate the charging rules in the packet data support node, or to keep them active (or activate them). In a particular embodiment the packet data support node comprises a node handling Traffic Plane Functions (TPF), e.g. a GGSN implementing TPF or a CGSN implementing TPF. It may alternatively comprise a standalone node or a gateway node handling TPF or TPF and policy enforcement (PEP).

According to different embodiments the charging and/or policy handling node comprises a CRF, a PDF or a PCCN. Particularly the first interface is Gx or Go/Gx merged with Gy if the charging and/or policy handling node is merged with an OCS, and the second interface comprises Rx or Rx merged with Gq.

A node (functional, logical or physical) in a communication system as initially referred to is also provided which is adapted to receive first mobile user station identity related information from a packet data support node relating to a bearer service request for a mobile user station, or at reception of a request for a bearer service from a mobile user station (UE) in the packet data support node, to receive second mobile user station identity related information from an application function relating to a service session or at reception of a request for a service session therein, and comprises verification means for establishing whether the request for a bearer service (to the packet data support node) and the request for a service session (to the application function) originate from the same mobile user station. Particularly the first mobile user station identity related information comprises one or more of MSISDN, IMSI and IP address of the mobile user station. Even more particularly the second mobile user station identity related information comprises IMS private identity (IMPI) and/or IMS public identity (IMPU) of the mobile user station or IMSI and/or the handling node is adapted to derive IMSI and/or MSISDN from IMPI and/or IMPU and/or adapted to request said IMSI and/or MSISDN from the application function.

The verification means are preferably adapted to compare the IP address corresponding to or included in the first mobile user station identity related information and the IP address corresponding to or included in the second mobile user station identity related information, and particularly to, if required establish and, use IMSI and/or MSISDN of said first and second mobile user station identity related information, to compare the associated IP addresses. Alternatively it is adapted to derive IMSI and/or MSISDN from a received IMS private and/or public user identity (IMPI/IMPU). Particularly the charging and/or policy handling node is adapted to construe a private user identity using IMSI of a mobile user station, e.g. when no IMSI application is implemented.

It may also be adapted to identify and install charging rules to be applied at reception of a request therefor from a packet data support node. Particularly it is adapted to identify and install charging rules to be applied at reception of request therefor from a packet data support node, and if the first and second user identity related information do originate from one and the same mobile user station, to implement the provisioned charging rules, and, if the first and second user identity related information do not originate from one and the same mobile user station, to reject the charging rules and/or deactivate implemented charging rules and discard concerned IP flow traffic, to inform the application function (AF) that no PDP-context is available or, to select whether to deactivate the charging rules in the packet data support node, or keep them active, if activated. Particularly it comprises a CRF, a PDF or a PCCN or a node with a similar functionality.

Still further a method as initially referred to is provided which comprises the steps of; receiving a request for bearer services from a mobile user station in a packet data support node; sending, from the packet data support node, first mobile user station identity related information of the mobile user station to a charging and/or policy handling node; receiving, subsequently, before or substantially simultaneously, a request for a service session from the mobile user station in an application function; sending, from the application function, second mobile user station identity related information to the charging and/or policy handling node; establishing, in the charging and/or policy handling node, whether the request for a bearer service to the packet data support node and the request for a service session to the application function originate from the same mobile user station.

As referred to earlier, particularly the first mobile user station identity related information comprises one or more of the MSISDN, IMSI and IP address of the mobile user station, and the second mobile user station identity related information comprises IMS private identity (IMPI) and/or IMS public identity (IMPU), or the second user identity related information comprises IMSI and/or MSISDN, e.g. derived from IMS private or public identity (IMPI,IMPU), or the application function is adapted to fetch said information from a HSS. Particularly the method further comprises the steps of; establishing or finding IMSI and/or MSISDN of said first and second mobile user station identity related information, comparing at least part of said first and said second mobile user station identity related information with each other, and even more particularly of comparing the IP addresses of said first and second mobile user station identity related information and/or deriving IMSI and/or MSISDN from received IMS private and/or public user identities (IMPI/IMPU), and/or construing, in the charging and/or policy handling node, a private user identity using IMSI of the mobile user station, e.g. when no ISIM application is implemented.

Advantageously it also comprises the step of; identifying and installing applicable charging and/or policy rules at reception of a request from a packet data support node. Most particularly the method further comprises the steps of; if the first and second mobile user station identity related information do originate from one and the same mobile user station; implementing the provisioned applicable charging rules and/or policy rules in the charging and/or policy handling node, otherwise, discarding concerned IP flow traffic; or selecting whether to keep active or deactivate the charging rules. In preferred implementations the packet data support node comprises a node handling Traffic Plane Functions, and is a stand-alone node, or a GGSN or a CGSN or a gateway node handling TPF and policy enforcement (PEP), and the charging and/or policy handling node comprises a CRF, a PDF or a PCCN or a node with a similar functionality.

BRIEF DESCRIPTION OF THE DRAWINGS

The invention will in the following be further described, in a non-limiting manner, and with reference to the accompanying drawings in which.

DETAILED DESCRIPTION OF THE INVENTION

Figure 1:
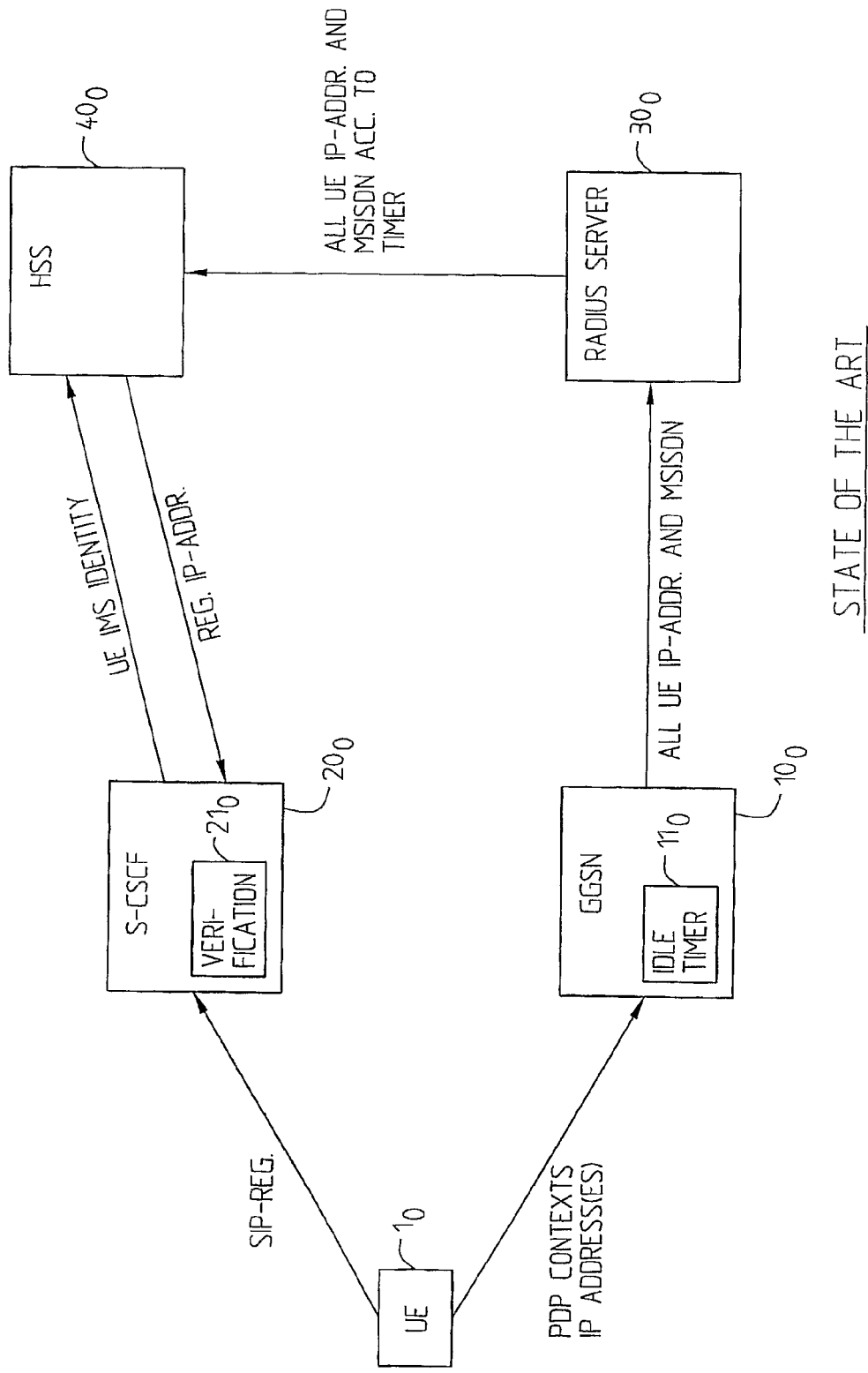
FIG. 1 shows a "state of the art" solution.

FIG. 1 shows the state of the art solution discussed earlier in the application for providing security for IMS accesses, particularly for early implementations of IMS not yet complying with the requirements of 3GPP TS 33.203. Such a solution is among others discussed in 3GPP TR 33.878. It is supposed that an UE $1_0$ requests a bearer from GGSN $10_0$. PDP-contexts are set-up in a conventional manner, primary or secondary depending on which is the relevant procedure. The user equipment UE $1_0$ may have several IP addresses, one IP address per IP network connection. GGSN comprises an idle timer $11_0$ through use of which an IP address can be reused for a user when re-establishing a PDP-context at a later stage. There is no specific IMS APN (Access Point Name) and GGSN cannot assume use of a signalling PDP-context. Knowing, in a conventional manner MSISDN and the IP address of UE $1_0$, GGSN $10_0$ sends MSISDN and the IP addresses over the Gi interface towards Radius Server $30_0$, i.e. all UE IP addresses and MSISDN are sent. The idle timer used in GGSN $10_0$ apparently is intended mainly to reduce the load on the HSS. This is suggested to be in the order of hours working in such a way that when there is no PDP-context available between GGSN and UE, the GGSN stores or reserves the allocated IP address for a specific UE for a time period which corresponds to the time set in the idle timer. This would mean that the GGSN does not upon termination of all bearers send any accounting-request-stop until the idle timer has actually expired. This idle timer does influence how IP addresses towards the UE are allocated or released.

The Radius Server $30_0$ forwards the information, i.e. MSISDN and the IP address to HSS $40_0$. All UE IP addresses and the MSISDN are sent according to the idle timer $11_0$ in the GGSN $10_0$, i.e. the sending will generally be slowed down, or delayed, until the idle timer expires.

Then a request for a SIP registration (SIP REGISTER) is sent from UE $1_0$ to S-CSCF, the S-CSCF sends the IMS identity onto the HSS $40_0$. HSS $40_0$ returns a reply to S-CSCF with the registered IP address back to the S-CSCF $20_0$. S-CSCF $20_0$ comprises a verification means $21_0$ or a functionality for performing a verification through verifying that the IP address from HSS $40_0$ is the same as the stored IP address in S-CSCF. If they are not the same, the session is terminated because it is assumed that an attack is ongoing.

The disadvantages of such a solution has been discussed earlier in the application.

Figure 2:
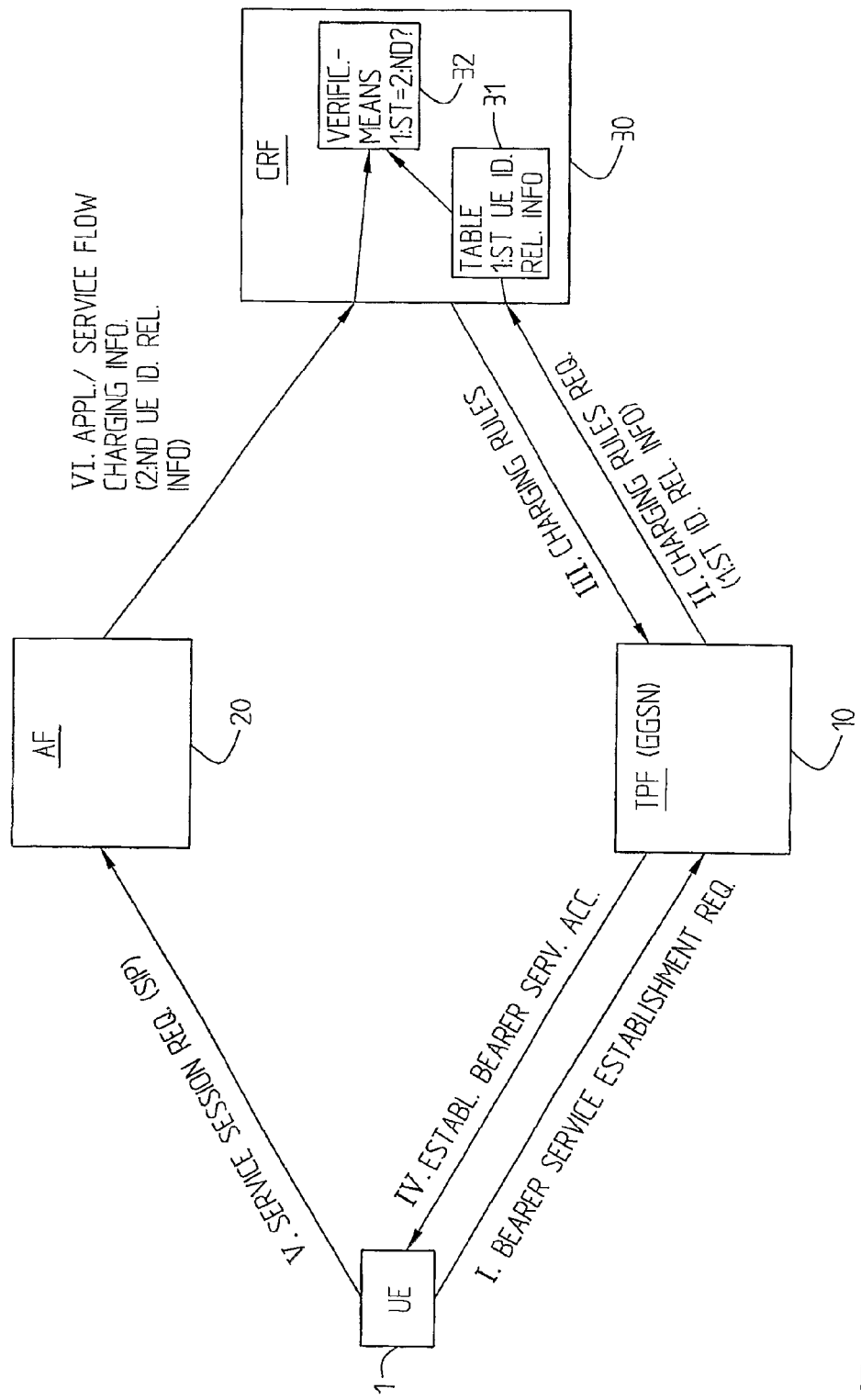
FIG. 2 is a schematical block diagram illustrating an arrangement according to the present invention.

FIG. 2 shows an arrangement according to one implementation of the inventive concept according which a FBC (Flow Based Charging) architecture is reused. The problem that is solved through the arrangement consists in the provisioning of a mechanism ensuring that the network is enabled to verify that the IP address of a user equipment UE 1 and the IMS identity of the UE 1 at SIP layer correspond to the same user at the bearer level. According to invention, the involved nodes or functions are the GGSN 10 handling traffic plane function TPF, (according to the inventive concept it is the traffic plane function that is used and it may be realized as a stand-alone node, provided in a GGSN or in a CGSN or in any node at least including the TPF functionality), a charging and/or a policy handling node 30 which in this embodiment is implemented as a CRF (Charging Rules Functionality) and an application function AF 20 which may be implemented as a S-CSCF, a P-CSCF or similar, and the concerned user equipment UE 1. CRF 30 comprises storing means, e.g. a table for storing first user equipment identity related information as will be explained below, and verification means 32 for verifying if at least a given part of a first UE identity related information corresponds to second UE identity related information, e.g. through comparing at least parts of said first and second identity related information respectively. By at least part of is meant that it might not be necessary to compare all the information depending on implementations, as also will be explained below. It is, however, in FIG. 2 supposed that UE 1 sends a request for bearer service establishment (I) to TPF 10 which may be implemented in a GGSN. TPF 10 then, in for example a CRF based implementation, as in FIG. 2, requests for charging rules (II) from CRF 30. First UE identity related information accompanies the request. The first UE identity related information may be provided from the UE or provided from TPF 10 (if it for example relates to a secondary PDP-context request). How this is done or acquired is not of importance for the functioning of the present invention, the main thing being that the first UE identity related information is available in TPF 10. The first UE identity related information accompanying the charging rules request is then stored into table 31 in CRF 30, CRF 30 among others using the first UE identity related information and possibly other information, for example QoS information about application function etc., identifies which are the relevant charging rules to be installed, and then provides the charging rules to TPF 10 (III). TPF 10 performs the relevant charging rule actions or provides for implementation of the provisioned charging rules, and sends an acceptance message relating to the establishment of the bearer service request, (IV) to UE 1.

Once a bearer has been established, UE 1 sends a request for a service session using SIP, (V) to AF 20. In GPRS systems, and from an FBC point of view, a proxy-CFCS and/or a serving-CFCS and/or an Interogating CSCF may, depending on operator configuration, act as an AF operating the Rx interface and/or the Gq interface. In the request using the SIP protocol, second user identity related information of the requesting is included. AF 20 then sends application/service flow charging information, including the second UE identity related information to CRF 30 (VI). If for example an S-CSCF acts as an AF, it may, before a registration session is proceeded, unsolicited forward the private user identity along with the IP address of the UE over Rx towards CRF 30. At PDP-context activation, FBC assumes that the IP address of the UE and IMSI (or MSISDN) are sent towards the CRF 30 over the Gx interface. Based on the above assumptions, CRF 30 is then aware of the IMSI both from the AF 20, particularly S-CSCF, and the TPF 10, particularly GGSN, and the corresponding IP addresses and hence capable to, in the verification means 32, check if the IP addresses match or originate from one and the same user (in FIG. 1 they actually both originate from the same UE, namely UE 1). If they do not correspond, or do not originate from one and the same end user, i.e. if there is no match between the IP addresses, CRF 30 (in this case; it should be clear that for policy handling the node could be a PDF, but it may also be a PCCN for handling policy and/or charging) notifies the AF 20, particularly S-CSCF, in order to provide for a termination of the SIP session, and the CRF 30 should deactivate any corresponding rule(s) at the TPF 10.

It could of course also be optional whether the session should be terminated or not and optionally it may be operator controlled, such that under certain circumstances for example an operator might want to localize or track an attacker and therefore would let the session proceed. Also for other reasons an operator might allow the session under certain conditions etc. The invention is not limited to any particular measures to be taken, but it is fundamental that an awareness is provided concerning the correspondence of addresses and possible attacks or similar.

The second user identity related information sent from AF 20 to CRF 30 may for example contain IMPI (IMS Private Identity), IMPU (IMS Public Identity), and the IP address. Alternatively the AF 20 may send IMSI or MSISDN directly. This can either be derived from the private identity or alternatively the AF, e.g. S-CSCF may contact HSS to identify IMSI or MSISDN.

If for example the UE does not contain an ISIM, (but for example an USIM) IMPI may be derived and the private user identity should take the form of a NAI and shall have the form username@realm as specified in IETF RFC 2486, clause 3.

A representation of the IMSI may be contained within the NAI for the private identity.

If there is no ISIM application, the private user identity is not known and it may then be derived from IMSI. The private user identity may be construed out of the IMSI by using the whole string of digits as username part of the private user identity, and by converting the leading digits of the IMSI, i.e. MNC and MCC into a domain name.

The result will be a private user identity of the form: "<IMSI>@ims.mnc<MNC>.mcc<MCC>.3gppnetwork.org". For example: If the IMSI is 234150999999999 (MCC=234, MNC=15), the private user identity will takes the form 234150999999999@ims.mnc015.mcc234.3gppnetwork.org Hence, CRF/PDF (PCCN) is capable to, based upon the reception of IMPI, i.e. the IMS Private Identity, or even IMPU, the Public User Identity, and IP address from an AF, for example a CSCF such as P-CSCF, S-CSCF, or I-CSCF, over Rx or Gq or Rx merged with Gq, derive IMSI (or MSISDN) of the UE. It should be noted that the AF alternatively may send MSISDN and/or IMSI directly over Rx/Gq as referred to above.

Furthermore, since the TPF, here TPF implemented in a GGSN, shall have the capability to send the IMSI or MSISDN to the CRF/PDF/PPCN (over Gx or Gx/Gy if merged), the CRF/PDF can then match the IMSI (or MSISDN) from CRF and TPF (here GGSN) with the respective IP addresses, i.e., CRF 30 is capable to find IMSI (MSISDN) from, here, GGSN and AF and check that it is the same IP address associated. If there is a match, the CRF preferably implements, in this case, charging rules as specified in 3GPP TS 23.125. If, on the other hand, the IP addresses do not originate from one and the same UE, the CRF may decide not to implement the charging rules or deactivate already implemented charging rules as referred to above, and hence the traffic may be discarded for the concerned IP flow. The CRF then informs the AF, e.g. a P-CSCF/S-CSCF that no PDP context is available.

Alternatively, may, in certain situations, as also referred to above, an operator want to allow the traffic, for example in order to track an attacker. Hence it may be an option for the charging and/or policy handling node 30 to keep rules in the TPF 10 active or to deactivate them.

In some implementations the TPF is implemented in a GGSN (or CGSN) but, as referred to above, TPF may be implemented in a stand-alone node or function or be allocated elsewhere than in a GGSN/CGSN, the main thing being that it is the traffic plane function TPF that is involved according to the inventive concept, since it is TPF that operates Gx towards CRF/PDF (or PCCN) (or Gx/Gy when merged).

The invention functions in a similar way for public user identities as for private user identities. 3GPP TS 23.003 specifies that when no ISIM is used, the temporary public user identity should be of the form "user@domain", and should therefore be equal to the private user identity. It is further possible to use a public user identity rather than the private identity at SIP layer. Then the AF, e.g. S-CSCF, may e.g. request an IMSI from HSS based on the public user identity, derive IMSI from the public user identity or send the public user identity towards CRF/PDF/PCCN that derives IMSI or sends a query to a Subscription Profile Repository, if implemented, cf. FIG. 5, for getting IMSI or MSISDN.

Figure 3:
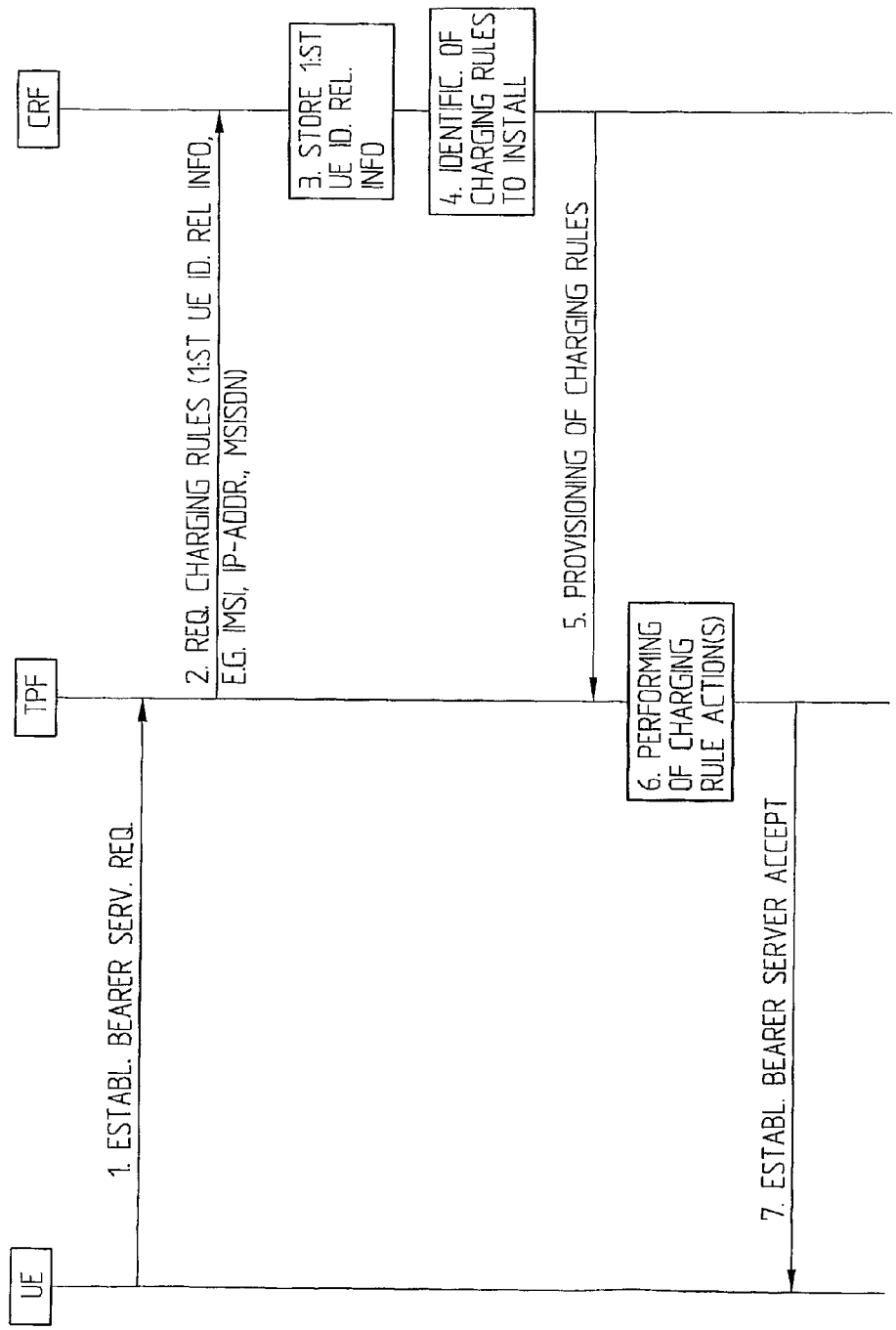
FIG. 3 is a simplified sequence diagram illustrating the provisioning of the first mobile user station identity related information to a charging and/or policy handling node.

FIG. 3 is a schematical sequence diagram illustrating the messaging between an UE, a TPF and, in this case a CRF. It should be clear, as referred to above, that the TPF can be provided for as a stand-alone node, in a GGSN, in a CGSN or in any other node or functioning means at least providing the TPF functionality. It should also be clear that instead of a CRF handling charging rules, it could as well be a PDF handling policy rules or a combined node or functionality handling e.g. both policy and charging. Hence, it is supposed that the UE, in a conventional manner, sends a request for establishment of a bearer service, 1, to e.g. a GGSN providing the TPF functionality. At PDP-context activation, first or primary, the GGSN, in this case, will send terminal identities such as one or more of IP address, MSISDN and IMSI towards CRF over the Gx interface in a request for charging rules, 2, i.e. the first user equipment identity related information is accompanying the request for charging rules. CRF stores the received first UE identity related information, 3, and identifies which are the charging rules that are applicable and should be installed, 4. Subsequently the charging rules are provisioned to TPF, 5. TPF at reception of the charging rules performs the charging rule action or actions, 6, and sends an establish bearer service acceptance message to UE, 7.

It should be clear that, as referred to above, the CRF may be merged with a PDF. Even more particularly CRF (and/or PDF or PCCN) may be merged with an Online Charging System OCS in which case Gx may be merged with Gy. These interfaces are defined in TS 23.125, and may e.g. in one embodiment both be based on Diameter Credit Control.

Figure 4:
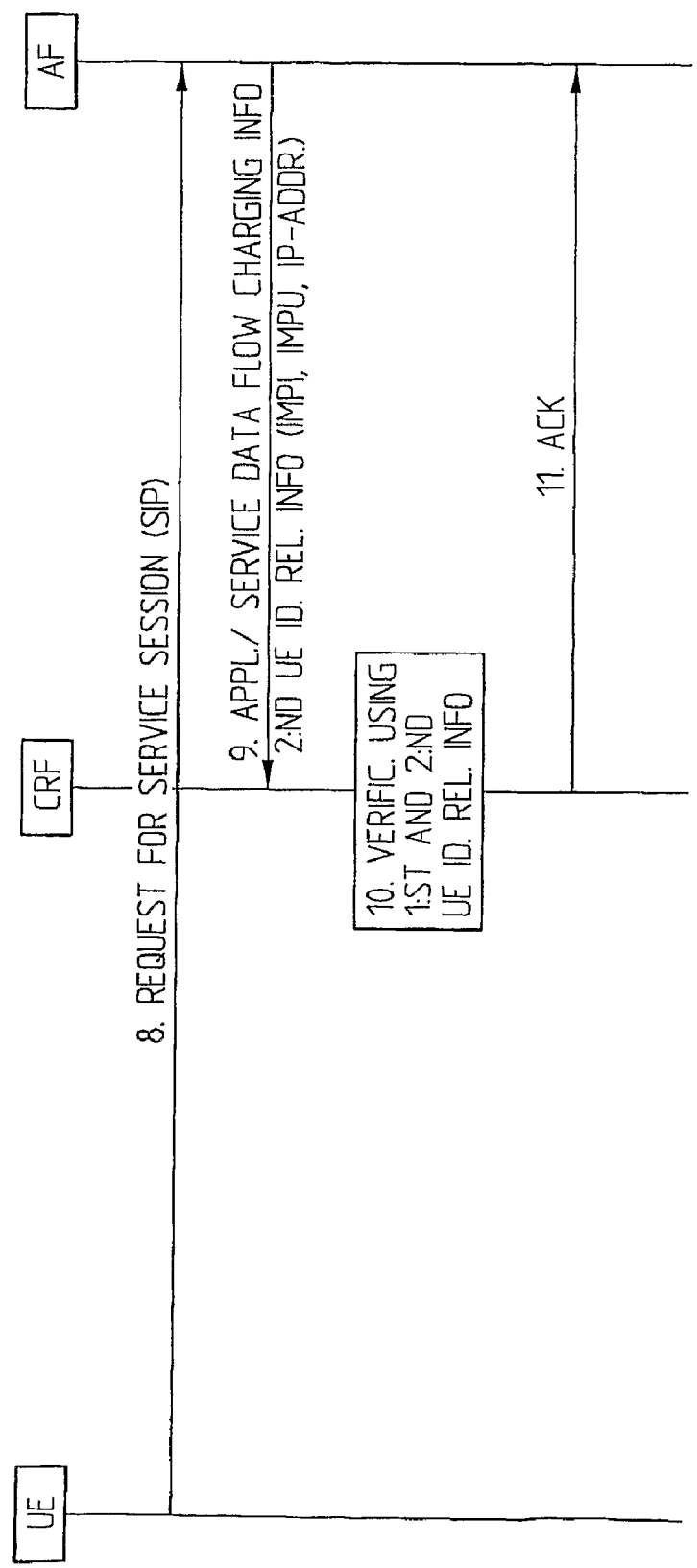
FIG. 4 is a simplified sequence diagram including the procedure when the second mobile user station identity related information is provided to the charging and/or policy handling node.

FIG. 4 is schematical sequence diagram illustrating the procedure through which the second UE identity related information is provided to CRF (for example) such that a verification can be carried out according to the inventive concept.

Hence, it is supposed that when UE sends a request for a service session using the SIP protocol, 8, to AF which e.g. may comprise a P-CSCF or an S-CSCF or an I-CSCF acting as an AF, this includes sending user identities to the CRF over Rx, which is described in 3GPP TS 23.228, which herewith is incorporated herein by reference. In other words, the UE sets up a SIP Register towards the IMS network. Hence, when a request for service session, SIP Register, 8, is sent to AF, AF provides application/service data flow charging information including second UE identity related information, e.g. IMPI, IMPU, IP address, to CRF, 9. CRF, having stored the first UE identity related information in storing means, fetches said first UE identity related information and compares it with the second UE identity related information received from the AF, 10. It is here supposed that the first and the second UE identity related information respectively originates from one and the same UE, and hence an acknowledgment, 11, is sent to AF and the service is setup implementing the relevant charging rules or similar.

It should be clear that the Rx interface may be merged with Gq and the AF may hence operate Rx/Gq. Rx and Gq may in particular embodiments both be based on Diameter Nasreq.

It should be clear that, as an alternative of sending IMPI and IMPU i.e. IMS private and public identity respectively as described in TS 23.228 and TS 23.003, the AF, or any CSCF, may send IMSI or MSISDN directly to CRF. IMSI or MSISDN may be derived from the private identity or communication with HSS may be needed for identification of IMSI or MSISDN. This has been discussed earlier with reference to FIG. 2.

The CRF particularly comprises a table for translation between IMPI and IMSI.

Figure 5:
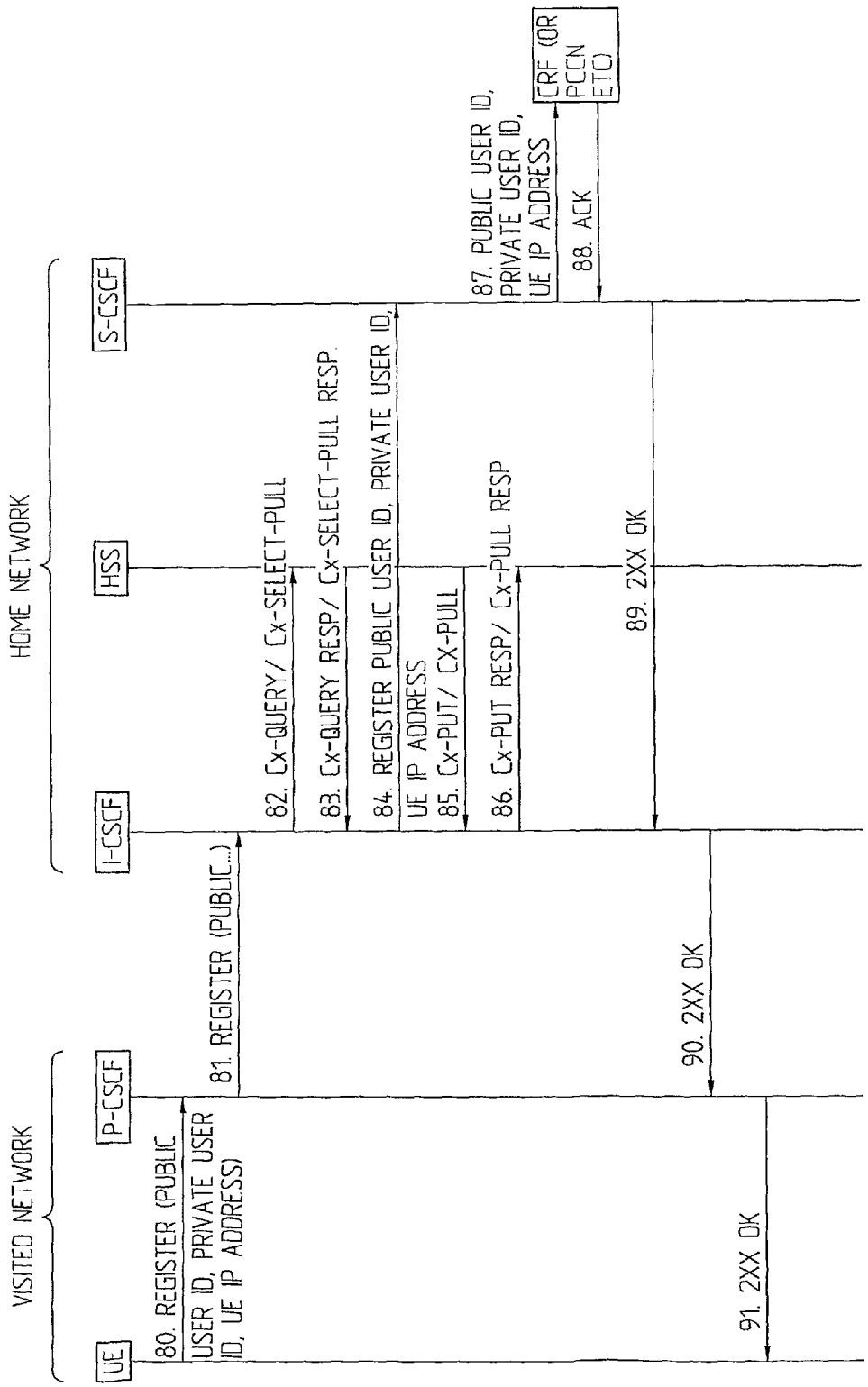
FIG. 5 is a sequence diagram illustrating an exemplary procedure of the provisioning of the second mobile user station identity related information and verification thereof.

FIG. 5 is a sequence diagram illustrating the procedure when the second UE identity related information is provided to e.g. a CRF or a PCCN etc., where (here) a successful verification is performed. It is here supposed that a PDP-context is established, and that the first UE identity related information is available in a CRF, PCCN etc. It is supposed that the UE is in a visited network and sends a SIP register, 80, with public user ID, private user ID, UE IP address to P-CSCF. The SIP register is sent from P-CSCF to I-CSCF of the UE home network, 81. I-CSCF sends a Diameter (in this particular embodiment) Cx-Query/Cx-Select-Pull message, 82, to HSS, which returns the corresponding response, 83, concerning IMS identities. SIP register with Public User ID, Private User ID, UE IP Address is then sent from I-CSCF to S-CSCF, 84. In this particular embodiment it is supposed that S-CSCF act as an AF. In alternative embodiments P-CSCF or I-CSCF may acts as AF. It shall be clear that here TPF and the subscription information repository are not visible.

Steps 85,86 relate to provisioning of security parameters, application IP address etc. which however is not of relevance for the inventive concept.

Subsequently it is supposed that the second UE identity related information, Public User ID, Private User ID, UE IP Address are provided to CRF (PCCN etc.), 87, and after verification (here supposed to be affirmative) with the first UE identity related information (not shown here), an acknowledgement is sent to S-CSCF, 88. S-CSCF sends a positive verification message, 2XX OK to I-CSCF, 89, which forwards it to P-CSCF, 90, which in turn forwards it to UE, 91.

Figure 6A:
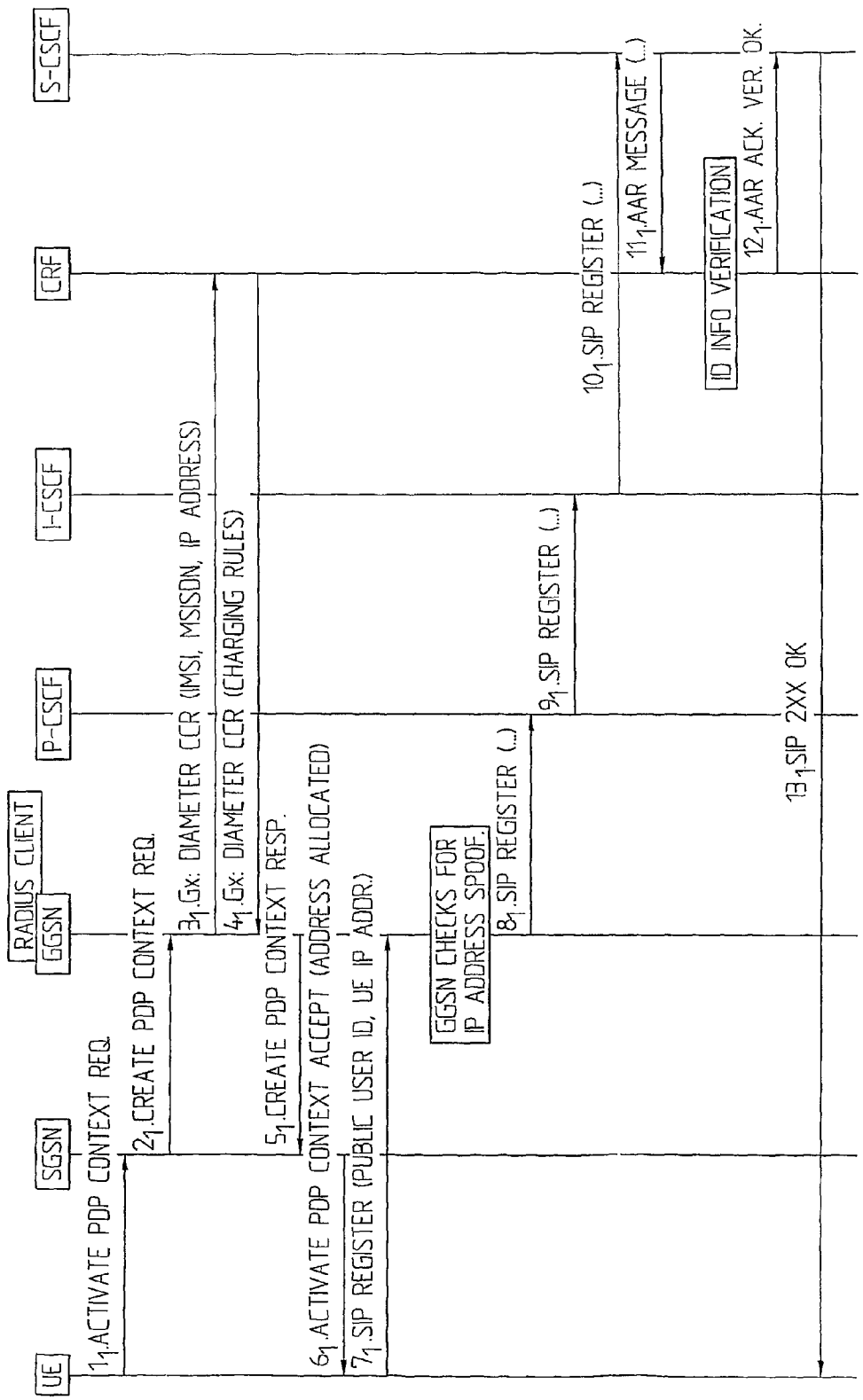
FIG. 6A is a sequence diagram describing an exemplary implementation and wherein the verification result is positive.

FIG. 6A shows one example of an implementation in which it is supposed that the $1^{st}$ and $2^{nd}$ UE identity related information can be positively verified (i.e. there is correspondence) and in which the Diameter protocol is used.

Thus, first the UE sends (here) an Activate PDP Context Request to (here) an SGSN, $1_1$. In a conventional manner SGSN sends a Create PDP Context Request to GGSN, $2_1$, which here uses a Radius Client to obtain IP addresses of UEs.

In this embodiment it is supposed that the Diameter protocol is used (cf. 3GPP TS 29.210), and GGSN sends a request for rules, here a Diameter CCR (Credit Control Request) with IMSI, MSISDN IP Address, over Gx to CRF (or PCCN etc.), $3_1$. CRF responds with a Diameter CCA (Credit Control Answer) with charging rules over Gx, $4_1$, to GGSN, which sends a Create PDP Context response to SGSN, $5_1$. SGSN sends an Activate PDP Context Accept to UE, $6_1$, with the allocated PDP Address (IP Address). As described earlier, it is supposed that the UE sends a SIP register to GGSN, $7_1$, which checks for IP address spoofing (i.e. checks that the UE has not changed, i.e. uses another, IP address than the one it has been given). When it is verified that the UE uses the "correct" IP address, a SIP register is sent to P-CSCF, $8_1$, which sends it to I-CSCF, $9_1$. I-CSCF then sends the SIP register to C-CSCF (here acting as AF), $10_1$.

In this embodiment it is supposed that S-CSCF sends a Diameter Message (Nasreg application) AAR to CRF, $11_1$, over Rx and containing the public user ID of the UE, and the private user ID and the IP address of the UE. CRF maps private and/or public user identity to MSISDN and/or IMSI to retrieve the associated IP address. CRF then performs the verification, i.e. checks whether the information received from GGSN (cf. step $3_1$) is the same, and acknowledges that the verification was successful (in this case) over Rx to S-CSCF in an AAA answer, $12_1$.

Finally a SIP 2XX OK message is sent from S-CSCF to UE, $13_1$.

Figure 6B:
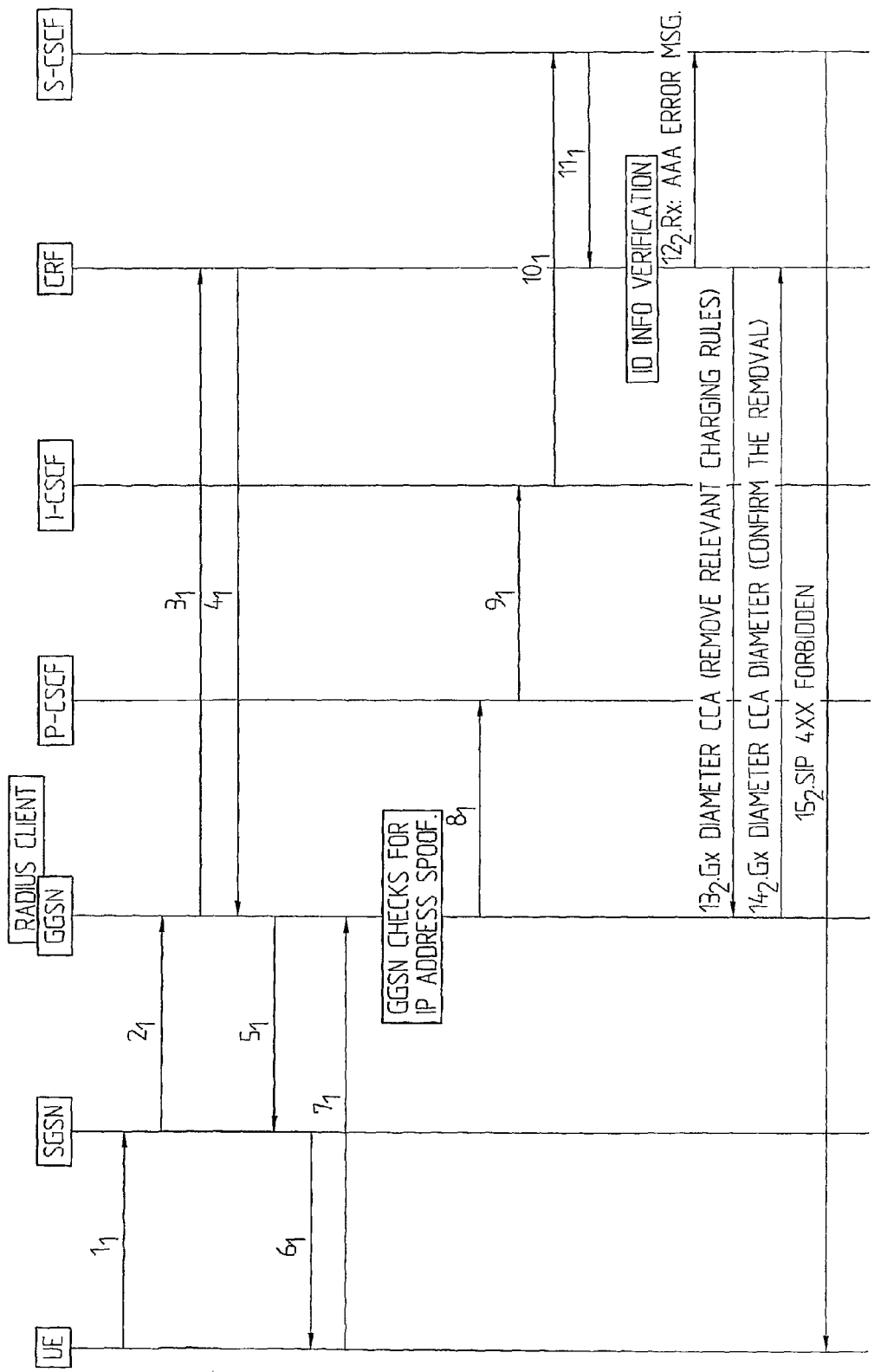
FIG. 6B is a sequence diagram describing the exemplary implementation of FIG. 6A but wherein the verification result is negative.

FIG. 6B is similar to FIG. 6A with the difference that the mapping in CRF is unsuccessful. Hence steps $1_1$-$11_1$ are similar to steps $1_1$-$11_1$ in FIG. 6A and therefore bear the same reference numerals.

Upon establishing in CRF that the mapping is unsuccessful, i.e. that the first and second UE identity related information is not the same, an error message is sent over Rx (Diameter) to S-CSCF, $12_2$. Optionally CRF may then send a Diameter CCA message over Gx to GGSN, $13_2$, that the relevant charging rules should be removed. GGSN then confirms the removal to CRF, $14_2$, and (in any case, irrespectively of whether steps $13_2$, $14_2$ are implemented or not) an error message is sent from S-CSCF to UE, e.g. a SIP 4XX Forbidden, $15_2$.

It should be clear that the inventive concept is not restricted to the use of Diameter. Radius may also be used or any other appropriate protocol. As referred to above, the flow will also be different if a CGGN is used, instead of a GGSN and a SGSN which however is not explicitly illustrated since the alterations should be obvious.

As also referred to above, it does not have to be S-CSCF that acts as an AF, and instead of a CRF it may e.g. be a PDF, PCCN etc.

Figure 7:
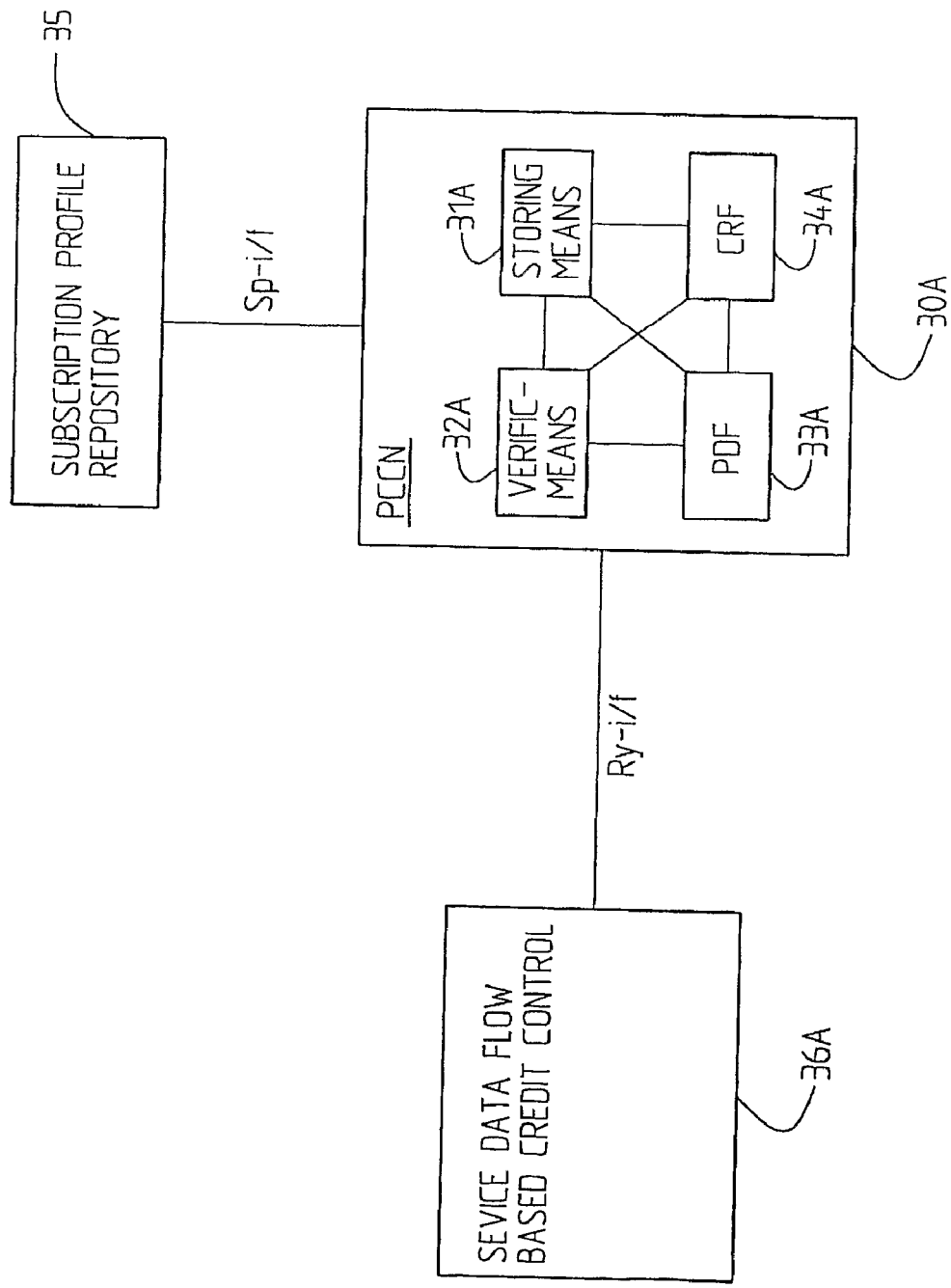
FIG. 7 is a schematical block diagram illustrating the inventive concept implemented in one general architecture.

FIG. 7 shows a particular embodiment in which the charging and/or policy handling node comprises a PCCN 30A (Policy and Charging Control Node). PCCN 30A communicates with service data flow based credit control 36A or more generally OCS. If for example PCCN 30A receives an IMS identity, e.g. IMPI from an AF (not shown) it may request IMSI from the subscription profile repository 35 over the Sp reference point (or particularly Sp-interface). More generally, if PCCN 30A receives an IMS identity, it may query subscription profile repository 35 in order to get a connection between the IMS identity (IMPI or IMPU) and the MSISDN or IMSI received from the TPF, e.g. in GGSN. This is advantageous in that it also covers cases when users utilize an ISIM which may have another structure for the IMPI, which for example is not based on IMSI or MSISDN. In still another embodiment (not shown) PCCN (or PDF 33A or CRF 34A in PCCN as an alternative to a PCCN), may query the service data flow based credit control 36A in order to get a connection between the IMS identity and the MSISDN/IMSI received from the TPF.

Figure 8A:
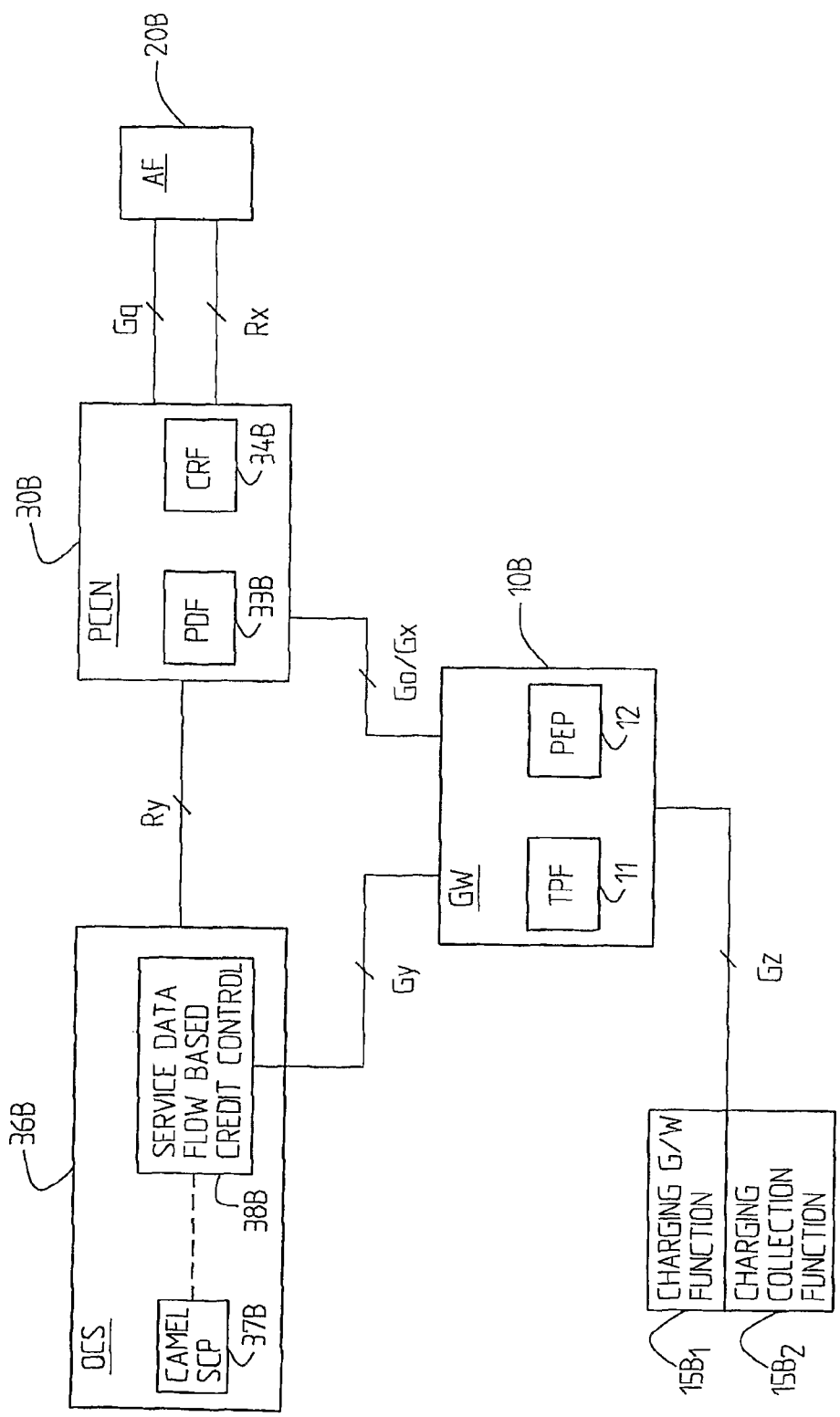
FIG. 8A illustrates another general architecture in which the inventive concept can be implemented.

FIG. 8A schematically illustrates another architecture in which the inventive concept is applicable. Such an architecture is for example described in TR 23.803. The charging and/or policy handling node here comprises a PCCN 30B with a PDF 33B and a CRF 34B communicating with an AF 20B over a merged Rx/Gq interface. The packet data support node including TPF functionality 11 here comprises a gateway 10B which in addition to the TPF functionality 11 also includes a PEP (Policy Enforcement Point) functionality, 12. Communication between PCCN 30B and gateway GW 10B takes place over the merged interface Go/Gx. PCCN 30B communicates with OCS (Online Charging System) 36B with a Camel SCP 37B and Service Data Flow Based Credit Control means 38B over the Ry interface. GW 10B communicates with OSC 36B over the Gy interface. GW 10B also communicates with a charging gateway function 15B$_1$ and a charging collection function 15B$_2$ over the Gz interface.

Figure 8B:
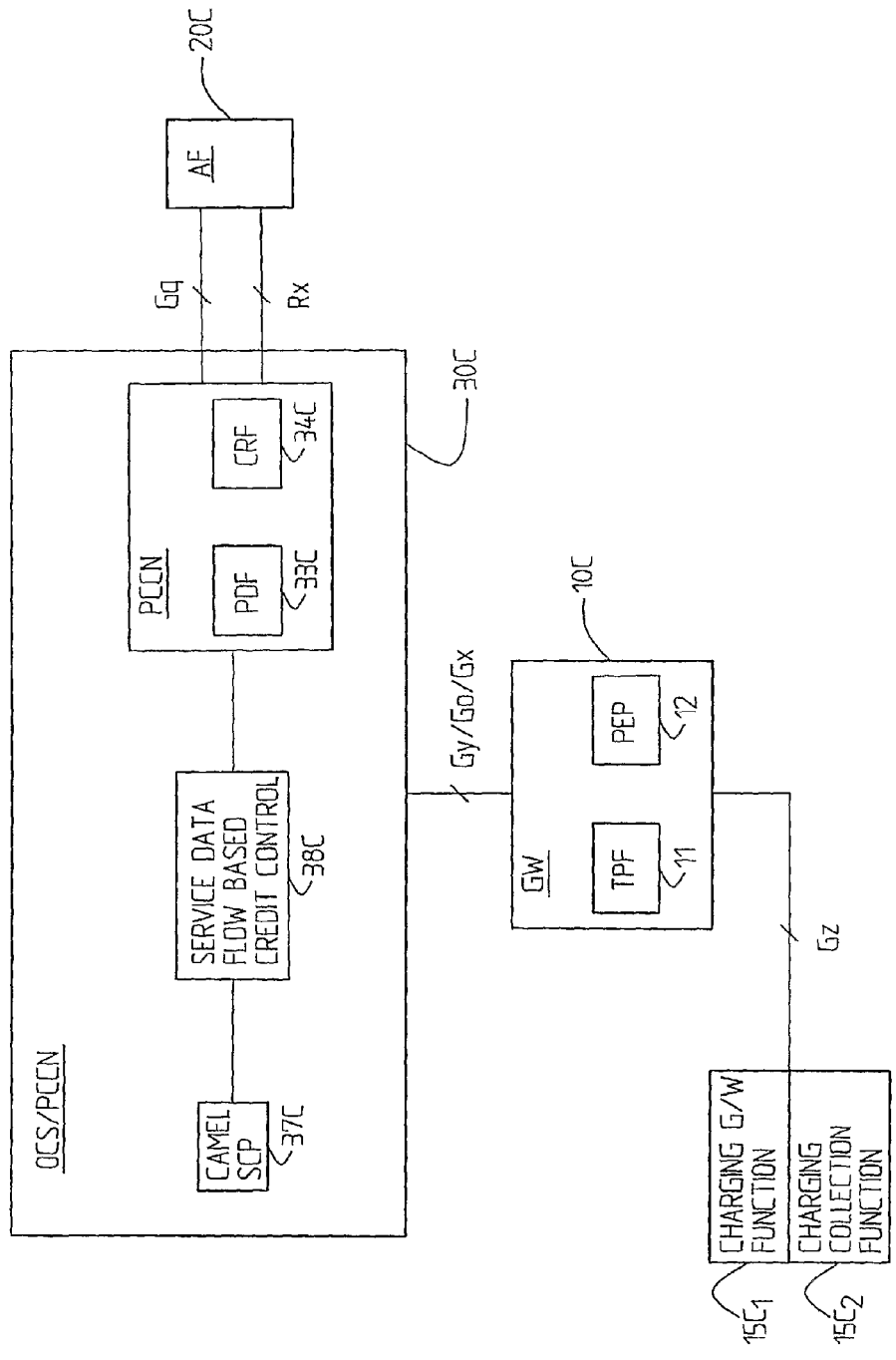
FIG. 8B shows still another architecture in which the inventive concept can be implemented.

FIG. 8B shows still another embodiment similar to that of FIG. 8A but with the difference that OSC and PCCN are merged into one node 30C, communicating with GW 10C over a merged interface comprising interfaces Gy/Go/Gx merged with one another. In other aspects FIG. 8B is similar to FIG. 8A and OCS/PCCN 30C communicate over a merged interface Gq/Rx with AF 20C and GW 10C communicates over Gz with charging gateway function 15C$_1$ and charging collection function 15C$_2$.

It should be clear that these figures are merely illustrated in order to show some additional examples on architectures in which the inventive concept can be applied.

Hence, according to the invention, through only a slight addition to existing FBC architectures or similar early IMS security can be provided for. Operators using FBC for non-IMS based services migrating towards IMS are given the opportunity to simply upgrade FBC instead of HSS and Radius server, which is very advantageous. The inventive concept involves no implications on for example a GGSN architecture e.g. IP address allocation or release as it is the case with the proposal given in TR 33.878 and there is also no need to introduce an idle timer in GGSN. According to the invention identities from IMS can be connected to e.g. GPRS based identities by using Rx and Gx interfaces.

Figure 9:
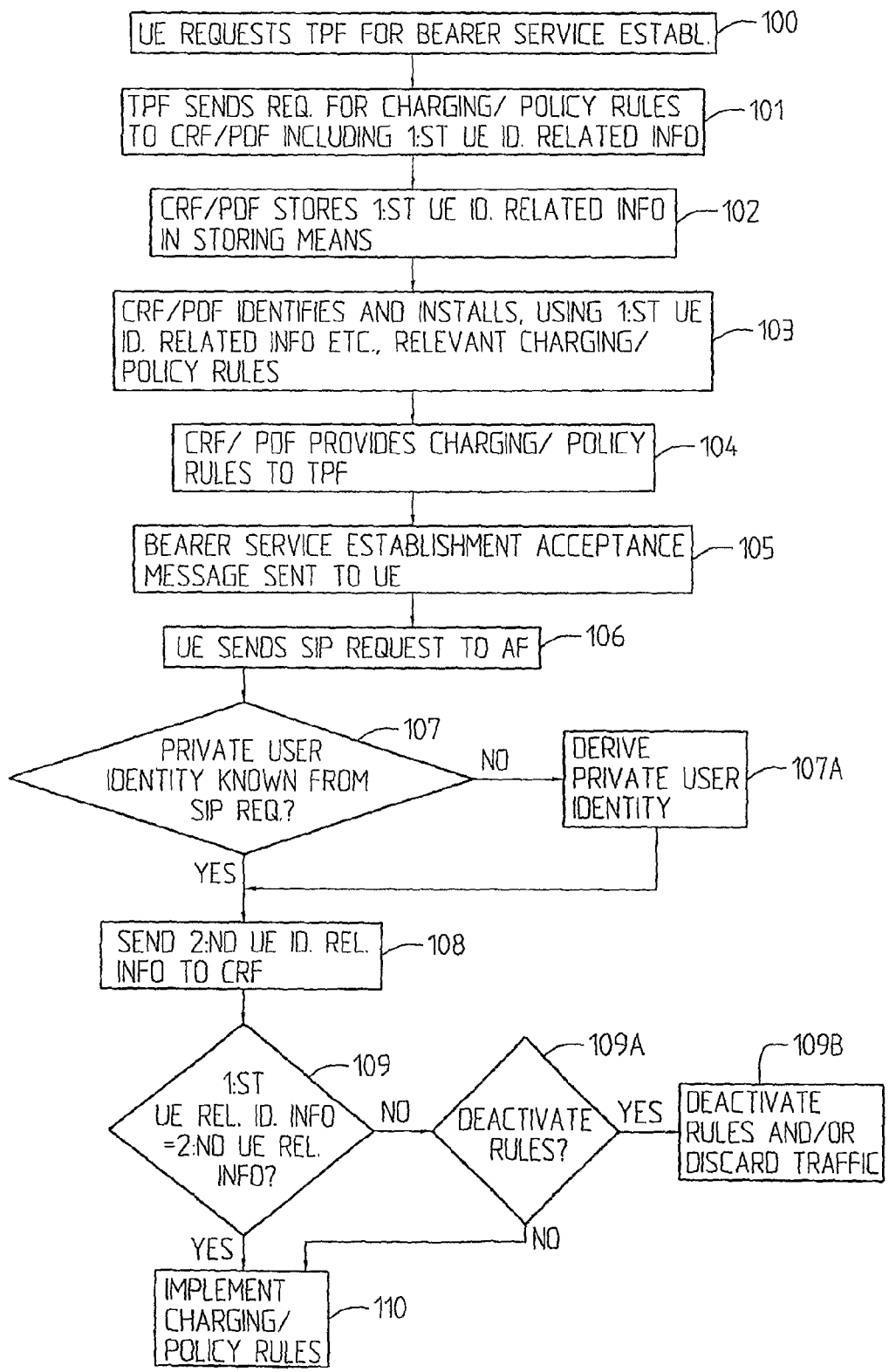
FIG. 9 is a flow diagram describing the procedure according to one embodiment of the present invention.

FIG. 9 is a flow diagram describing one implementation of the inventive concept. It is here supposed that an UE requests TPF for bearer service establishment, 100. In the request, the UE includes first UE identity related information, or if it is a secondary PDP-context request, the first UE identity related information is already stored in the node handling TPF. This is however known in the art.

TPF then sends a request for charging and/or policy rules to CRF or PDF, or a PCCN, depending on the applicable implementation, including said first UE identity related information, 101. CRF/PDF (or PCCN) stores the first UE identity related information in storing means, e.g. a table, 102. Subsequently CRF/PDF (or PCCN) identifies and installs, using said first UE identity related information and possibly other information as referred to above, the relevant charging and/or policy rules, 103. Then CRF/PDF (or PCCN) provides the charging and/or policy rules to TPF, 104. A Bearer Service Establishment Acceptance message is then sent from TPF to UE, 105. Once a bearer service has been established, it is supposed that UE sends a SIP message or a SIP request, e.g. a SIP invite, to an Application Function AF, 106. It may then be checked whether the private user identity is known from the SIP message, 107. If not, it may be derived somehow either in AF or in communication with some other node or function as discussed above, 107A. Then, as well as if the private user identity actually was known from the SIP message or SIP request, the second UE identity related information is sent to CRF/PDF or PCCN, 108. In CRF/PDF or PCCN it is thus then examined whether the first UE identity related information and the second UE identity related information originate from one and the same UE, 109. If not, it is checked whether the charging and/or policy handling rules are to be deactivated, 109A, if yes, they are deactivated and/or the concerned traffic is discarded, 109B. If however the option is selected that the rules are not to be deactivated in step 109A, as well as if the first and the second UE identity related information respectively do originate from one and the same UE, the charging and/or policy rules are implemented, 110.

It should be clear that the invention is not limited to the specifically illustrated embodiments but that it can be varied in a number of ways within the scope of the appended claims.

The invention claimed is:

1. A communications system, comprising:
   at least one packet data support node;
   at least one charging and/or policy handling node; and,
   at least one application function for handling mobility management and call control of mobile user stations requesting and/or accessing services; wherein:
   each packet data support node comprises means adapted to send, upon reception of a request for bearer services from a mobile user station, first mobile user station identity related information over a first interface to a charging and/or policy handling node;
   the application function comprises means for sending, upon reception of a request for a service session from a mobile user station, second mobile user station identity related information over a second interface to the charging and/or policy handling node; and,
   the charging and/or policy handling node comprises verification means adapted to establish whether the request for a bearer service to the packet data support node and the request for a service session to the application function originate from one and the same mobile user station.

2. The system according to claim 1, wherein the mobile user station identity related information comprises one or more of Mobile Station Integrated Services Digital Network (MSISDN), International Mobile Subscriber Identity (IMSI) and Internet Protocol (IP) address of the mobile user station.

3. The system according to claim 1, wherein the second mobile user station identity related information comprises IP Multimedia Subsystem (IMS) private identity and/or IMS public identity.

4. The system according to claim 1, wherein the charging and/or policy handling node is adapted to identify and install charging rules to be applied at reception of request therefore from a packet data support node.

5. A charging and/or policy handling node in a communications system supporting communication of packet data and arranged to communicate with an application function and a packet data support node, wherein said charging and/or policy handling node is adapted to:
   receive first mobile user station identity related information from the packet data support node at reception of a request for a bearer service from a mobile user station;
   receive second mobile user station identity related information from the application function at reception of a request for a service session therein and,
   verify whether the request for a bearer service to the packet data support node and the request for a service session to the application function originate from the same mobile user station.

6. A charging and/or policy handling node according to claim 5, wherein the first mobile user station identity related information is selected from the group consisting of the Mobile Station Integrated Services Digital Network (MSISDN), International Mobile Subscriber Identity (IMSI) and Internet Protocol (IP) address of the mobile user station.

7. A charging and/or policy handling node according to claim 5, wherein it is further adapted to:
   identify and install charging rules to be applied at reception of request therefore from a packet data support node; and, if the first and second user identity related information do originate from one and the same mobile user station, it is adapted to implement the provisioned charging rules and, if the first and second user identity related information do not originate from one and the same mobile user station, it is adapted to reject the charging rules and/or deactivate implemented charging rules.

8. A method of controlling service access in a packet data communication system comprising a plurality of packet data nodes, at least one charging and/or policy handling node, and a plurality of application functions handling mobility management and call control of mobile user stations, comprising the steps of:

receiving a request for bearer services from a mobile user station in a packet data support node;

sending, from the packet data support node, first mobile user station identity related information of the mobile user station to a charging and/or policy handling node;

receiving a request for a service session from the mobile user station in an application function;

sending, from the application function, second mobile user station identity related information to the charging and/or policy handling node; and, determining, in the charging and/or policy handling node, whether the request for a bearer service to the packet data support node and the request for a service session to the application function originate from the same mobile user station.

9. The method according to claim 8, wherein the mobile user station identity related information is selected from the group consisting of the Mobile Station Integrated Services Digital Network (MSISDN), International Mobile Subscriber Identity (IMSI), Internet Protocol (IP) address of the mobile user station, and IP Multimedia Subsystem (IMS) private identity and/or IMS public identity.

10. The method according to claim 8, further comprising the step of identifying and installing applicable charging and/or policy rules at reception of a request from a packet data support node.

* * * * *

UNITED STATES PATENT AND TRADEMARK OFFICE
CERTIFICATE OF CORRECTION

PATENT NO.        : 7,843,860 B2
APPLICATION NO.   : 11/719062
DATED             : November 30, 2010
INVENTOR(S)       : Boman Page 1 of 1

It is certified that error appears in the above-identified patent and that said Letters Patent is hereby corrected as shown below:

In Column 2, Line 1, delete "(MISISDN)" and insert -- (MSISDN) --, therefor.

In Column 2, Line 4, delete "Server)" and insert -- Server). --, therefor.

In Column 3, Lines 17-40, delete "Therefore............HSS." and insert -- Therefore an arrangement as initially referred to is needed through which IMS security can be provided for in a straight-forward and easy manner. Particularly an arrangement is needed through which so called "early" IMS security can be provided, i.e. in networks still not (fully) complying with the 3GPP TS 33.203 Release 5. Particularly an arrangement is needed through which attacks can be detected and prevented and particularly through which security can be increased for end users as well as for operators, for example such that an attacker is prevented from using certain services for free or making someone else pay for it, and that an attack can be detected as early as possible which is extremely important for the end user as well as for the operator. --, therefor.

In Column 4, Line 18, delete "MSISDN, IMSI" and insert -- MSISDN, International Mobile Subscriber Identity (IMSI) --, therefor.

In Column 9, Line 48, delete "PPCN" and insert -- PCCN --, therefor.

In Column 12, Line 33, delete "CGGN" and insert -- CGSN --, therefor.

Signed and Sealed this
Twenty-fifth Day of October, 2011

David J. Kappos
*Director of the United States Patent and Trademark Office*